(12) United States Patent
Eguchi

(10) Patent No.: US 6,193,902 B1
(45) Date of Patent: Feb. 27, 2001

(54) METHOD FOR TRANSPORT AND/OR STORAGE OF LIVE BAITS, PROCESS FOR PREPARING ARTIFICIAL MUDDY SAND USED FOR TRANSPORT AND/OR STORAGE OF LIVE BAITS AND CONTAINER FOR LIVE BAITS

(75) Inventor: Tetsu Eguchi, Tokyo (JP)

(73) Assignee: E & T Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/371,441

(22) Filed: Aug. 1, 1999

(30) Foreign Application Priority Data

Nov. 11, 1998 (JP) .................................................. 10-358369
Apr. 9, 1999 (JP) .................................................. 11-139072

(51) Int. Cl.$^7$ .......................... C09K 17/40; A01K 29/00; A01K 61/00
(52) U.S. Cl. ................................ 252/1; 119/6.7; 119/200; 119/201
(58) Field of Search ............................. 119/6.7, 416, 417, 119/201, 200; 252/1

(56) References Cited

U.S. PATENT DOCUMENTS

| | | | |
|---|---|---|---|
| 5,183,950 | * | 2/1993 | Popiel et al. .............................. 800/2 |
| 5,664,366 | * | 9/1997 | Lopuszanski et al. .................... 43/55 |
| 5,888,526 | * | 3/1999 | Tsubai et al. .......................... 424/405 |

* cited by examiner

Primary Examiner—Joseph D. Anthony
(74) Attorney, Agent, or Firm—Ladas & Parry

(57) ABSTRACT

This invention aims to provide a method for transport and/or storage of live baits adapted to alleviate a lose occurring in the course of transport and/or storage and to maintain a freshness of the live baits for a long period. The method according to the invention comprises making artificial muddy sand used to transport and/or store live baits. The method comprises the steps of: immersing paper products in artificial seawater to fibrillate the paper products; preparing a mixture of plants cellulose fiber of the paper product fibrillated in the artificial seawater and muddy sand of the live baits' native seashore; and forming granular artificial muddy sand containing an amount of seawater from the mixture.

2 Claims, 6 Drawing Sheets

METHOD FOR TRANSPORT AND/OR STORAGE OF LIVE BAITS, PROCESS FOR PREPARING ARTIFICIAL MUDDY SAND USED FOR TRANSPORT AND/OR STORAGE OF LIVE BAITS AND CONTAINER FOR LIVE BAITS

BACKGROUND OF THE INVENTION

1. Field of the Invention

This relates to a method for transport and/or storage, a process for preparing artificial muddy sand used for transport and/or storage of live baits for fishing and a contain for live baits.

2. Description of the Related Art

Recently, availability of various live baits for fishing such as *Perinereis aibuhitensis* Grube have largely depended on import from foreign countries, but a loss of live baits occurring in the course of transport from their habitats to destinations has been noticeable and their surviving rate is said to be as low as in order of 60%. It is important for the live baits to be stored (and/or transported) without deterioration of their freshness. While a method of breeding the live baits in seawater to avoid such deterioration of freshness has been attempted, such method has not been effective to solve the problem. For example, exchange of seawater is troublesome and a period of survival is at most one week. In addition, none of appropriate and simplified methods has been proposed for preparing artificial muddy sand which will be effectively used to transport and/or store the live baits. There has been still another problem such that the live baits creep out from container during transport and/or storage or at a site of fishing, since the live baits have behavior of restoring their vigorous activities at the normal temperature.

SUMMARY OF THE INVENTION

In view of the problems as have been described above, it is a first object of the invention to provide a method for transport and/or storage of live baits adapted to alleviate a loss occurring in the course of transport and/or storage and to maintain a freshness of the live baits for a long period.

It is a second object of the invention to provide a method for preparing artificial muddy sand effectively used for transport and/or storage of the live baits.

It is a third object of the invention to provide a container for the live baits which is convenient not only for transport and/storage of the live baits but also convenient to handle it at a site of fishing and adapted to prevent the live baits from creeping out therefrom.

The first object set forth above is achieved, according to a first aspect of the invention, by a method for transport and/or storage of live baits comprising steps of: washing the live baits collected on their habitat with seawater to remove extraneous matter such as muddy sand and then transporting said live baits to a transit station; transporting the muddy sand collected on the habitat of said live baits to the transit station separately of said live baits; packaging, at said transit station, the live baits in containers together with artificial muddy sand containing seashore muddy sand collected on the live baits' native seashore and artificial seawater; and cooling the live baits packaged in said containers and transporting to destinations and/or storing.

Said artificial muddy sand containing artificial seawater is prepared by granulating a mixture of said muddy sand collected on the live baits' native seashore and plant cellulose fiber.

Said artificial muddy sand containing artificial seawater is prepared by adding said mixture of the muddy sand collected on the live baits' native seashore and said plant cellulose fiber with additives such as activated charcoal and granulating this mixture.

Before transported to the transit station and/or destinations, the live baits are left in seawater to discharge excrement's from their body and then the live baits are taken out from seawater to make them discharge an amount of seawater taken in their body.

On the transit station, the live baits are transferred into artificial seawater adjusted to have a same salinity as that of the live bait's native seawater to make the live baits discharge excrement's from their bodies.

Paper product is immersed in artificial seawater to fibrillate said paper product; a mixture of plant cellulose fiber obtained by fibrillation in said artificial seawater and muddy sand of the live baits' native seashore is prepared; artificial muddy sand containing an amount of said artificial seawater is formed from said mixture; and, at the transit station, the live baits are packaged in the container together with said artificial muddy sand.

Said artificial seawater is adjusted to have a same salinity as that of the live baits' native seawater.

The live baits are cooled together with said artificial muddy sand containing artificial seawater to suppress the activity of the live baits.

Said artificial muddy sand is cooled at a same temperature as that of the live baits' native muddy sand.

Said temperature for cooling said artificial muddy sand is 3° C.~9° C.

Said artificial muddy sand is supplemented with an amount of artificial seawater by spraying said artificial muddy sand with the artificial seawater adjusted to have a same salinity as that of the live baits' seawater.

A plurality of the container each containing the live baits are single outer casing at the transit station to transport it to the destination and, at said destination, said containers taken out from said outer casing are cooled or said containers are immediately distributed to the consumers.

The method for transport and/or storage of live baits as has been described above can be summarized as follows:

Transport to the destinations is started only after the live baits have discharged most of excrement's as well as seawater from their bodies. The live baits packaged in the container together with the artificial muddy sand containing a certain amount of the artificial seawater are placed at a temperature sufficiently low to suppress the live baits' activity throughout transport to the destinations or storage. The artificial muddy sand comprises the plant cellulose fiber obtained by fibrillating paper product, the muddy sand of the live baits' native seashore and an appropriate amount of the artificial seawater. The live bait containers arriving at the destinations are stored at a low temperature or immediately distributed to the consumers. The live baits collected in this manner at the transit station can be then efficiently transported and/or stored without any deterioration of their freshness.

The second object set forth above is achieved, according to a second aspect of the invention, by a method for making artificial muddy sand used to transport and/or store live baits comprising steps of: immersing paper product in artificial seawater to fibrillate said paper product; preparing a mixture of plant cellulose fiber of said paper product fibrillated in said seawater and muddy sand of the live baits' native seashore; and forming granular artificial muddy sand containing an amount of seawater from said mixture.

Said step of fibrillating paper product comprise a step of immersing paper product in the artificial seawater adjusted to have a same salinity as that of the live baits' native seawater to fibrillate said paper product.

The plant cellulose fiber obtained by immersing paper product in the artificial seawater for fibrillation has a high water-holding ability and use of the muddy sand gathered on the live baits' native seashore can reproduce a living environment approximating to the live baits' native seashore. The mixing ratio of the artificial seawater, the plant cellulose fiber and the seashore muddy sand may be appropriately adjusted in order to obtain the artificial muddy sand suitable for transport and/or storage of the live baits.

The third object set forth above is achieved, according to a third aspect of the invention, by a container for live baits adapted to contain the live baits together with the artificial muddy sand comprising the muddy sand of the live baits native seashore, the plant cellulose fiber and a certain amount of artificial seawater, said artificial muddy sand being deformable, incompletely solidified and present in the form of grains each smaller than an average diameter of the live bait so that the live baits are kept in even contact with said artificial muddy sand scattering on the bottom of the container.

The artificial muddy sand scattering on the container bottom comprises the muddy sand of the live baits' native seashore and the plant cellulose fiber. As has previously been described, such artificial muddy sand has a high water-holding ability and reproduces a living environment approximating to the live baits' native seashore. In addition, the artificial muddy sand is deformable and there is no apprehension that the live baits might be damaged even if they briskly move in contact with the artificial muddy sand. The artificial muddy sand are solidified to an appropriate degree so that the live baits can not dig themselves into the artificial muddy sand but can effectively contact the granular artificial muddy sand.

Preferably, the container for live baits comprises a lid having a top plate and a peripheral wall A and a base having a bottom plate and a peripheral wall B so that said lid is detachably fitted to said base, wherein said peripheral wall B of said base gradually flares toward its upper opening and wherein a periphery of said upper opening is placed against an inner peripheral surface of said lid and a space is formed between said peripheral wall A and said peripheral wall B as said lid is fitted to said base.

Preferably, container for live baits comprises a lid having a top plate and a peripheral wall A and a base having a bottom plate and a peripheral wall B so that said lid is detachably fitted to said base, wherein an upper opening of said base is provided with a flange extending outward from a periphery of said upper opening and wherein said flange is placed against an inner peripheral surface of said lid and a space is formed between said peripheral wall A and said peripheral wall B as said lid is fitted to said base.

Said flange is elastically pressed against the inner peripheral surface of said lid.

Said base has a flexibility.

Said base is formed with ribs.

With this novel container, undesirable gap is never formed between the lid and the base as the former is fitted to the latter and an apprehension that the live baits might creep out from the container can be avoided even if they restore vigorous activities and movements. Firmly holding the base with finger tips inserted from below into the space between the peripheral wall A and the peripheral wall B, opening as well as closing can be easily performed.

DETAILED DESCRIPTION OF THE PREFERRED EMBODIMENTS

Figure 1:
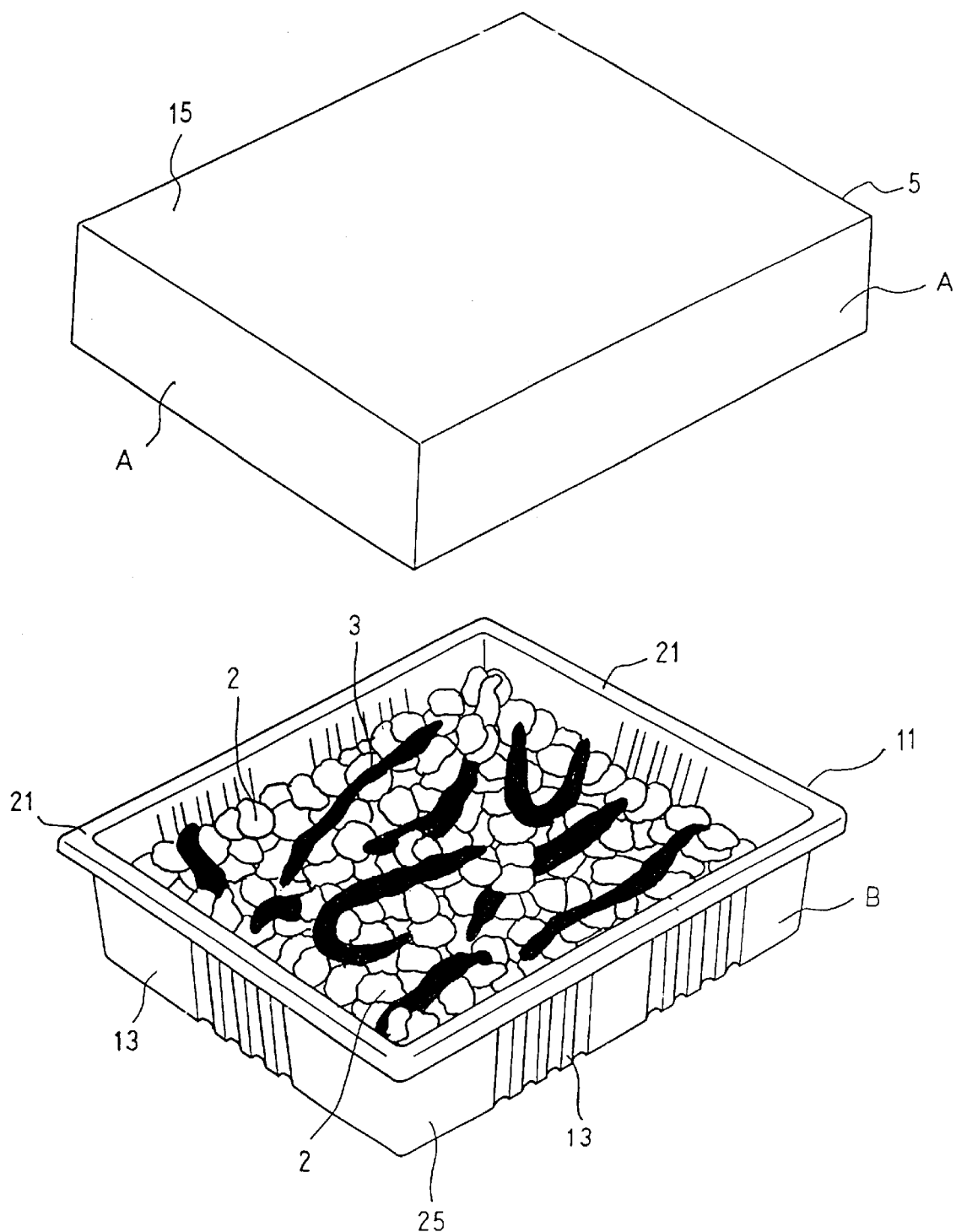
FIG. 1 is a perspective view of a live bait container according to an embodiment of the invention with a lid lifted off so as to reveal live baits contained in a base of the live bait container together with artificial muddy sand.
Figure 2:
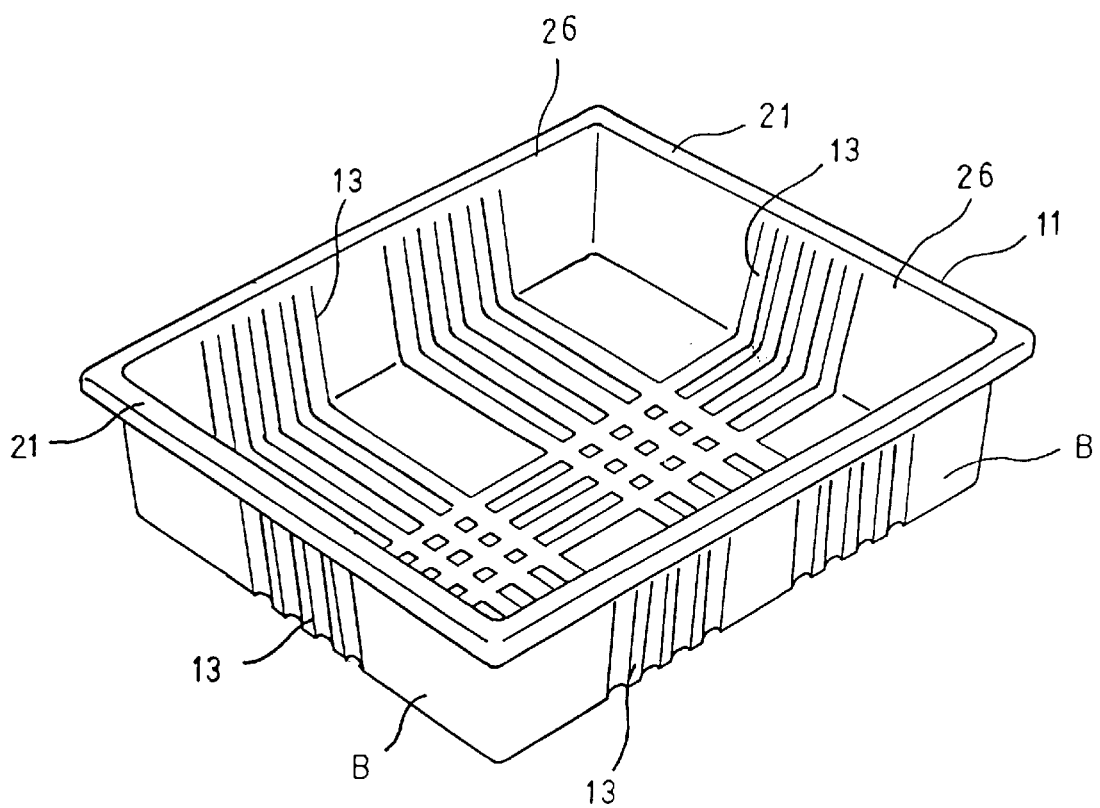
FIG. 2 is a perspective view showing the base of the live bait container.

Details of the invention will be more fully understood from the description given hereunder in reference with the accompanying drawings.

Live baits 3 generally have a behavior of digging themselves into the muddy sand of seashore and therefore they carry thereon extraneous matter such as said muddy sand even after they have been gathered. Such extraneous matter clinging to the live baits 3 must be washed away with seawater (natural seawater) for the reason as will be described. The gathered live baits 3 move briskly at the normal temperature and therefore the extraneous matter (particularly when they are dried and hardened) might wound the live baits 3. Such wound would deteriorate the surviving rate of the live baits 3 and, even if they can survive, these live baits 3 would be degraded. This problem is solved by washing the extraneous matter away from the live baits 3 (i.e., the surviving rate is improved).

The gathered live baits 3 are transferred into seawater (natural seawater) before transported to a transit station and they are left to discharge excrement into the seawater without being fed during a period of approximately 30 minutes. Upon completion of excretion, the live baits 3 are taken out from the seawater and left for a period sufficient for the live baits 3 to discharge an amount of the seawater taken by them. It should be understood that the live baits 3 have taken a large amount of seawater while they have discharged their excrement in the seawater. The live baits taken out from the seawater discharge the amount of seawater taken by them without any aid of an operator. The time period necessary for the live baits to discharge the amount of seawater is also approximately 30 minutes. In this manner, the time period of approximately 30 minutes is effective for both the discharge of the excrement and the discharge of the seawater.

Thereafter the live baits 3 are transported to the transit station. For this transport, a container 1 in which the vermiculite or the like is laid (not shown) is usually utilized. Obviously, the live baits 3 can be collected from a plurality of habitats to a common transit station. Separately of the live baits 3, the muddy sand of their native seashore also are transported to the transit station. The muddy sand of their native seashore is used as material for artificial muddy sand which will be described later. It should be understood that means to transport the live baits 3 as well as the muddy sand of their native seashore is not limited to any particular means and, for example, the airplane maybe used to transport them, if necessary. At the transit station, all kinds of means may be concentrated, which are effective for transport of the live baits 3 to various destinations as well as for the subsequent storage the live baits 3.

At the transit station, the live baits 3 are transferred again into seawater, invigorated thereby and their freshness is maintained. At this point also, the live baits 3 are left in seawater to discharge excrement without being fed. Then, the live baits 3 are taken out from seawater to make them discharge an amount of seawater taken in their bodies. In this case also, discharge of the excrement as well as the seawater can be effectively completed by approximately 30 minutes, respectively. For such discharge of the excrement as well as the seawater, artificial seawater presenting a same salinity as that of their native seawater is used. In view of a fact that a salinity of seawater is variable depending on various factors such as the geographical position and the season, said artificial seawater having its salinity adjusted may be used to easily invigorate the live baits 3. A plurality of tanks filled with artificial seawater presenting salinities depending on particular habitats may be prepared to centralize the maintenance of the live baits 3 transported from the respective habitats to this transit station and additionally to efficiently transport the live baits 3 to various destinations inclusive of foreign countries. The transit station may be laid out not only in coastal areas but also in inland areas. It is difficult to intake a large amount of seawater at each habitat as well as to transport this to the transit station. In addition, putrefaction of natural seawater would lead to degradation of water quality. On the contrary, the artificial seawater is free from such drawbacks.

If the live baits 3 still containing in their bodies excrement's and a large amount of seawater, these live baits 3 would rapidly grow weak. Such problem can be solved and the surviving rate can be improved by allowing the live baits 3 to discharge excrement's and seawater to an adequate degree. In addition, an apprehension that the excrement's of the live baits 3 might accumulate and putrefy within the container 1 can be alleviated and thereby their living environment can be protected against deterioration.

While it is desirable to transport and/or store a large number of live baits 3 in a light and small container 1, these live baits 3 would be forcibly brought in contact one with another fully or partially of their bodies within this small container 1. The container 1 overcrowded in this manner with the live baits 3 is disadvantageous for their living environment. The surviving rate of the live baits 3 rapidly drops particularly when the temperature rises within such overcrowded container 1. To a void such situation, the invention proposes a countermeasure that an appropriate number of live baits 3 are packaged in the container 1 together with artificial muddy sand. The live baits 3 packaged in the container 3 are maintained in contact with granular artificial muddy sand 2 at least partially of their bodies and thereby the live baits 3 are protected from being brought in direct and full contact one with another. The granular artificial muddy sand 2 advantageously increases the number of points at which the live baits 3 come in contact with said artificial muddy sand 2 and thereby increases opportunities of such contact.

The artificial muddy sand 2 at least contains artificial seawater. Basically, the artificial muddy sand 2 is granular and comprises a mixture of plant cellulose fiber and seashore muddy sand. The artificial muddy sand 2 may further comprise additives such as activated charcoal. The muddy sand approximating the native muddy sand of the live baits is reproduced by the artificial muddy sand 2 comprising muddy sand of seashore (preferably the muddy sand collected on the habitat of the live baits) and artificial seawater (preferably the artificial seawater having a salinity artificially adjusted to the salinity of the live baits' native seawater). The live baits 3 have a behavior of digging themselves into the muddy sand and spontaneously weaken their activity. The invention utilizes such behavior of the live baits 3. Specifically, the live baits 3 packaged in the container 1 together with the artificial muddy sand 2 strive to be first for digging themselves among grains 2, 2 of the artificial muddy sand. While some of them may fail to dig themselves among grains 2, 2 of the artificial muddy sand 2 if the number of live baits 3 is relatively large, their bodies at least partially come in contact with the granular artificial muddy sand 2 as they strive to dig themselves and vigorously move their bodies. As a result, the state in which the live baits 3 have successfully digged themselves in the natural muddy sand on the seashore or the state more or less similar to said natural state is reproduced. In this manner, the live baits 3 spontaneously weaken their activity. It should be understood that the shape as well as the size of the grains constituting the artificial muddy sand 3 are not critical.

The live baits 3 packaged in the container 1 may be cooled together with the artificial muddy sand 2 to weaken their activity further effectively. More specifically, the live baits 3 may be cooled at a substantially same temperature as the temperature of their native muddy sand (usually cooled at a temperature in the order of 10° C.~13° C.) to make them spontaneously weaken their activity. The live baits 3 may be cooled at a further lower temperature (usually at a temperature in a range of 3° C.~9° C.) to further weaken their activity practically to the inactive condition. However, cooling at a temperature lower than 2° C. would adversely affect the live baits 3. The live baits 3 begin to restore their vigorous movement as the temperature rises to the normal level after cooling has been stopped.

By transporting and/or storing the live baits 3 with their activity weakened or suppressed, their freshness can be maintained and thereby their surviving rate can be improved. The live baits 3 are substantially free from excrement's during their transport and/or storage. Accordingly, a number of live baits 3 can be packaged in the relatively small container 1 without an apprehension that the live baits 3 might be affected by putrefaction of excrement's. The artificial muddy sand 2 added with activated charcoal will advantageously adsorb an offensive odor emitted by the live baits 3. A loss of the artificial seawater possibly occurring in the course of transport and/or storage of the live baits 3 may be compensated by spraying the artificial muddy sand 2 laid in the container 1 with an additional amount of the artificial seawater having the salinity adjusted to the salinity of the natural seawater on the live baits' habitat. In this manner, a deficiency of the artificial seawater contained in the artificial muddy sand 2 can be effectively compensated during transport and/storage of the live baits 3, particularly during such transport and/storage for a relatively long period.

Figure 9:
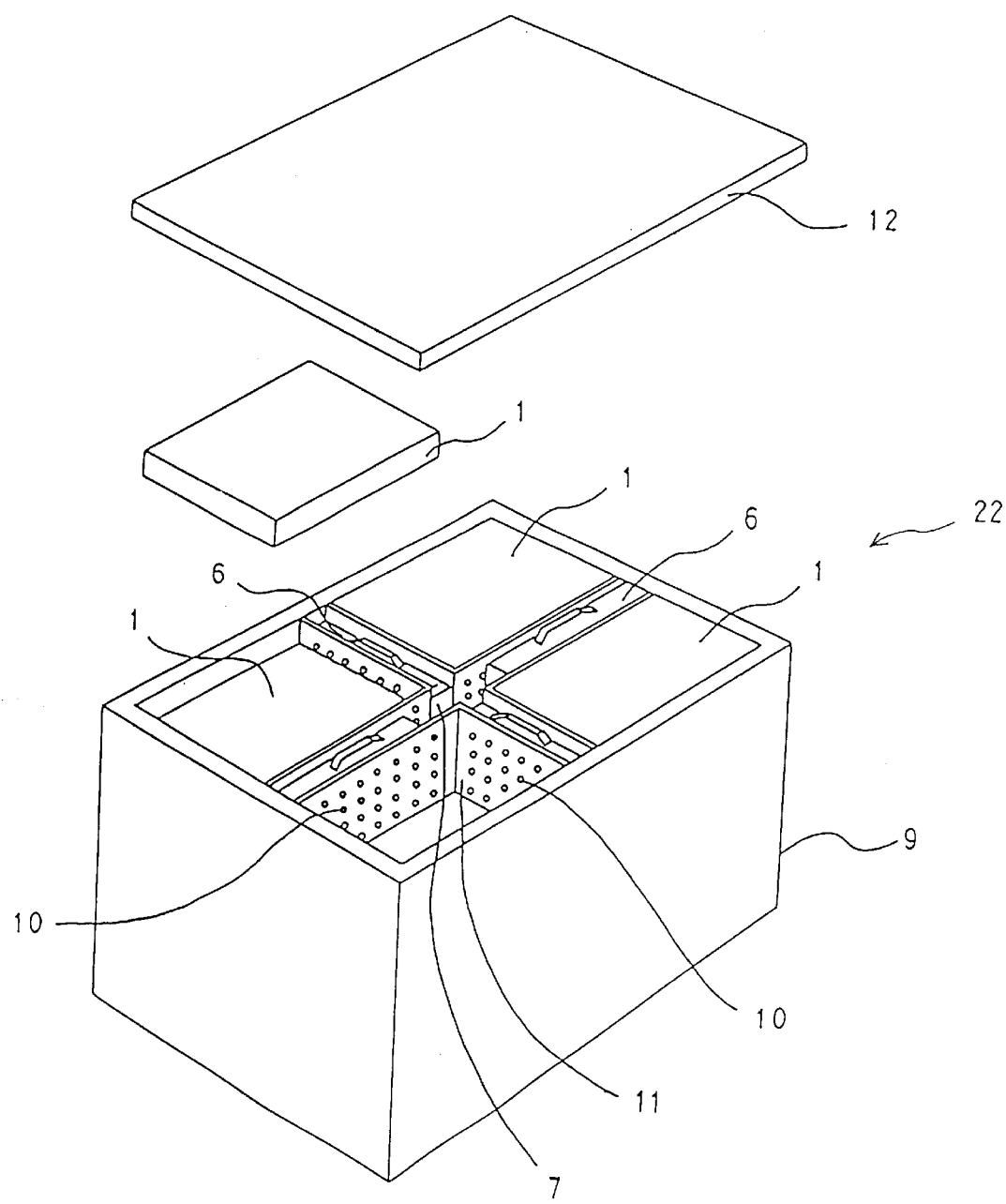
FIG. 9 is a perspective view of an outer casing packed with a plurality of the live bait containers.

Cooling may be performed in a manner that the live baits 3 packaged in the container 1 is cooled together with the artificial muddy sand 2 laid therein using suitable cooling means such as chill storing agent or such container 1 is placed in a refrigerator or the like. Cooling may be performed as occasion demands during transport and/or storage. At the transit station, a plurality of the containers 1 each containing therein live baits 3 are packaged in the outer casing 22 for transport to a destination at which, in turn, traders may keep the outer casing 22 or the respective containers 1 taken out from the outer casing 22 cold. It is also possible for the traders to distribute the containers 1 to the consumers immediately after these containers 1 have been taken out from the outer casing 22. For distribution of the live baits 3 to the consumers, it is unnecessary to subdivide the content of each container 1. The live baits 3 are practically free from excrement's, so it is unnecessary for the traders to wash them again and to breed them in seawater at the destinations. It is also possible for the consumer to temporarily store the container 1 in the refrigerator before actual use thereof. The live baits 3 restore their activity at the normal temperature, for example, at the time of actual use thereof. Referring to FIG. 9, the outer casing 22 comprises a base 8 and an upper lid 12 wherein said base 8 is divided by partitions 11 in a plurality of chambers adapted to receive the containers 1, respectively. Each of said partitions 11 are formed with many through-holes 10. Passages 7 defined between each pair of adjacent partitions 10 are adapted to receive chill storing means 6 so that the chill emitted from the respective chill storing means 6 flows through said passages 7 and then said through-holes 10 to the respective containers 1 so as to cool these containers 1.

Now the container 1 for the live baits 3 will be described more in details. The container 1 is not only useful for, as has been described above, transport and/or storage of the live baits 3, but also useful merely to keep the live baits 3 alive, for example, at the site of fishing. The container 1 has the granular artificial muddy sand 2 laid on the bottom thereof and said artificial muddy sand 2 contains the artificial seawater and consists of the muddy sand obtained on the native seashore of the live baits and the plant cellulose fiber. Said artificial seawater has a salinity adjusted to the salinity of the live baits' native seawater. Preferably, the granular artificial muddy sand 2 containing the artificial seawater is deformable, not in a completely hardened condition and has a grain-size smaller than a diameter of each live bait 3, for example, in the order of 2 mm~15 mm. Being not in a completely hardened condition, there is no apprehension that the live baits 3 might be wounded due to contact with the artificial muddy sand 2 as would be caused by the artificial muddy sand which is dried and completely hardened. The artificial muddy sand 2 prepared according to the invention is not in the completely hardened condition but in an appropriately hardened condition and has a grain-size smaller than the average diameter of the live baits 3. Therefore, the live baits 3 can not dig themselves into the individual grains of the artificial muddy sand 2. A degree of hardening is preferably adjusted depending on various factors such as the amount of seashore muddy sand of the habitat, the amount of the artificial seawater and the degree in which the artificial muddy sand 2 is pressed together. The live baits 3 do not ingest the artificial muddy sand 2 in the course of transport and/or storage of the live baits 3. In addition, the artificial muddy sand 2 contains natural muddy sand of the live baits' native seashore and therefore it is easy for the consumer to separate the live baits 3 from the artificial muddy sand 2 at the site of fishing.

Figure 3:
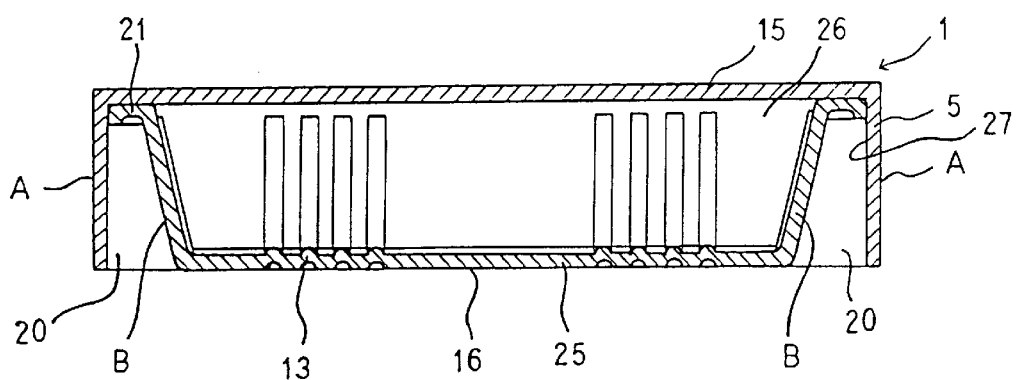
FIG. 3 is a sectional view showing a live bait container according to a specific embodiment of the invention with the lid put on the base.
Figure 6:
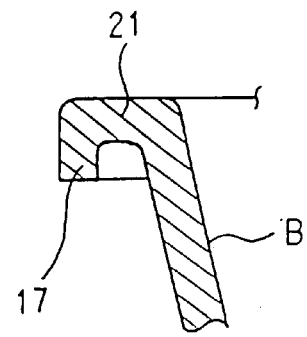
FIG. 6 is a scale-enlarged sectional view showing an embodiment of the upper peripheral edge of the live bait container's base.
Figure 7:
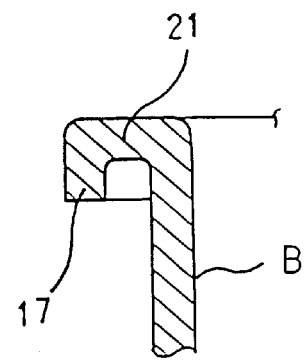
FIG. 7 is a view similar to FIG. 6 showing another embodiment of the upper peripheral edge of the live bait container's base.
Figure 8:
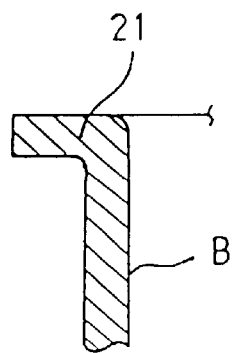
FIG. 8 is a view similar to FIG. 6 showing still another embodiment of the upper peripheral edge of the live bait container's base.

As will be apparent from FIGS. 1–4, the container 1 comprises the lid 5 defined by a top plate 15 and peripheral wall A and the base 25 defined by a bottom plate 16 and peripheral wall B so that the lid 5 may detachably cover the base 25. According to a specific embodiment of the container 1 shown in FIG. 3, the peripheral wall B is gradually flared toward an upper opening 26 of the base 25 so that the periphery of the upper opening 26 comes in contact with an inner peripheral surface 27 of the lid 5 and a space 20 is formed between the peripheral walls A and B as the lid 5 is fitted on the base 25. In other words, the base 25 flares upward to its upper opening 26 and the peripheral wall B obliquely extends upward to the upper opening 26 as shown in a section in view (FIG. 6). The periphery of the opening 26 is formed with a flange 21 extending outward therefrom so that said flange 21 comes in contact with the inner peripheral surface 27 of the lid 5 as the latter is fitted on the base 25 (FIG. 3). In this manner, no gap is left between the periphery of the opening 26 and the inner peripheral surface 27 of the lid 5 and therefore there is no apprehension that the live baits 3 might creep out from the container 1 even when the live baits 3 restore their vigorous activity at the normal temperature.

The flange 21 may be elastically pressed against the inner peripheral surface 27 of the lid 5 to achieve a tight contact of said flange 21 with said inner peripheral surface 27 leaving no gap therebetween and thereby to effectively prevent the live baits 3 from creeping out. Additionally, the lid 5 can be fitted thereby on the base 5 with a high stability and fitting of the lid 5 to the base 25 as well as removal thereof from the base 25 can be easily performed. The base 25 is obtained by molding synthetic resin having a flexibility and provided with reinforcing ribs 13. The lid 5 is made of breathable material such as cardboard. The base 25 made of water-impervious material such as synthetic resin effectively prevents the artificial seawater contained in the artificial muddy sand 2 from leaking through the walls of the container 1. On the other hand, the lid 5 made of breathable material is advantageous for breathing of the live baits 3 stored in the container 1.

Figure 4:
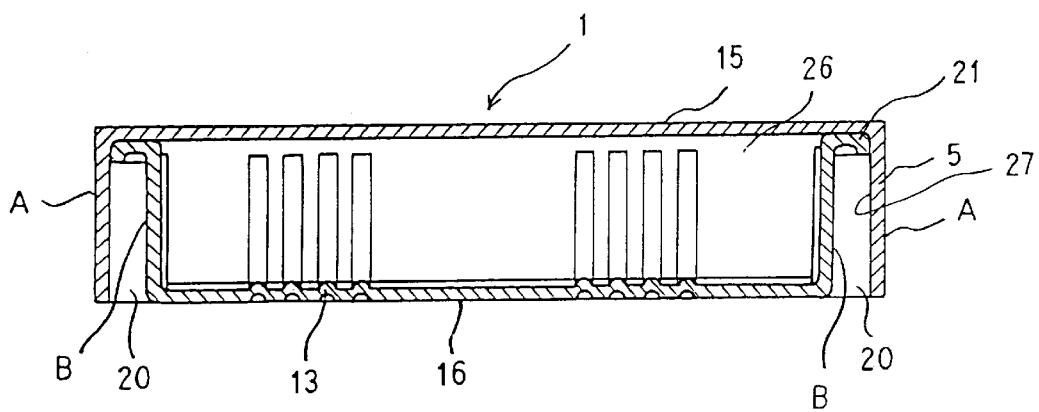
FIG. 4 is a view similar to FIG. 3 showing of a live bait container according to another embodiment of the invention with the lid put on the base.

The container 1 shown in FIG. 4 is similar to the container 1 shown in FIG. 3 in that the base 25 is provided with said flange 21 and differs from the latter in that the base 25 has its peripheral wall B vertically extending from the bottom plate 16. In this case also, a space 20 is formed between the peripheral wall A of the lid 5 and the peripheral wall B of the base 25. In either case, the consumer may insert the finger tips of one hand into the space 20 and hold the lid 5 with the finger tips of the other hand when it is desired to fit or remove the lid 5 to or from the base 25. Handling of the lid 5 is easily performed since the base 25 can be held by the finger tips inserted into the space 20 from below.

Figure 5:
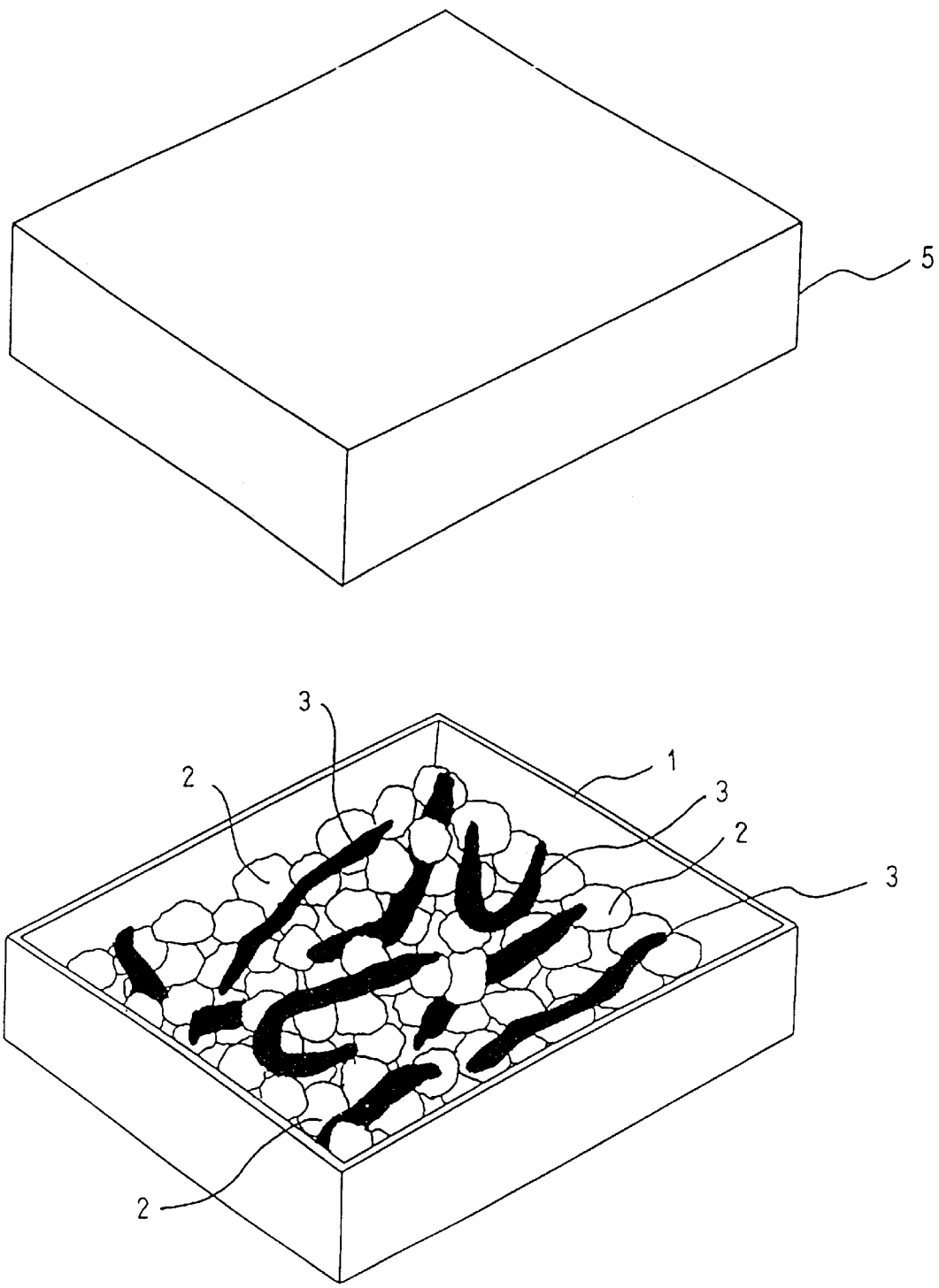
FIG. 5 is a view similar to FIG. 1 showing a live bait container according to an alternative embodiment of the invention with the lid lifted off so as to reveal live baits contained in the base together with artificial muddy sand.

Operation of fitting or removing the lid 5 to or from the base 25 is further facilitated when the sections of the peripheral wall B which are opposed to each other are light pressed inward with two fingers of the consumer inserted into the space 20 and holding the base 25 so that said base 25 made of flexible material may be appropriately deformed. In this case, there is no apprehension that the base 25 might be excessively deformed, because the base 25 is provided with reinforcing ribs 13. Upon release of the pressure by the fingers, the base 25 readily restores its initial shape under a restoring force of the reinforcing ribs 13. The flange 21 sufficiently reinforces a strength as well as a rigidity of the periphery of the opening 21 to protect this periphery from being broken. In addition, the flange 21 effectively assists the opening to restore its initial shape. The container 1 may be also constructed so that the lid 5 is not formed with the flange and the base 25 is not formed with the reinforcing ribs, as shown in FIG. 5.

Now a method according to the invention for making the artificial muddy sand used for transport and/or storage of the live baits, more specifically, a method for making the artificial muddy sand comprising a mixture of plant cellulose fiber and muddy sand collected on the seashore will be described in details. The method comprises steps of: immersing appropriate paper product in the artificial seawater for fibrillation of said paper product; preparing a mixture of the plant cellulose fiber fibrillated in the artificial seawater and muddy sand collected on the seashore of the live baits' habitat; and forming granular artificial muddy sand containing the artificial seawater from said mixture.

The step of immersing the paper product in the artificial seawater for fibrillation of said paper product is performed by throwing the paper product into a dissolution tank filled with the artificial seawater. The paper product is swollen with the artificial seawater and fibrillated to the plant cellulose fiber. The paper product may be stirred in the artificial seawater to ensure the fibrillation. While it is preferred to use toilet paper as the paper product because of its aptitude for fibrillation, the paper product useful for the invention is not limited to the toilet paper. The fibrillation is preferably performed in the artificial seawater having its salinity adjusted to that of the native seawater of the live baits.

The step of preparing a mixture of the plant cellulose fiber and the muddy sand is performed by mixing the plant cellulose fiber fibrillated in the artificial seawater with the muddy sand collected on the seashore of the live baits' habitat. The particular type of the artificial muddy sand which is finally obtained depends on a mixing ratio selected on this step of mixing. Specifically, the artificial muddy sand containing the plant cellulose fiber as its principal component, the artificial muddy sand containing the seashore muddy sand as its principal component or the artificial muddy sand containing these two components at a well balanced ratio is obtained. Said two components are adequately mixed together until a substantially uniform mixture is obtained. If the artificial seawater has been adjusted, on the previous step, to have a same salinity as the seawater of the live baits' habitat, the artificial muddy sand approximating the muddy sand on the live baits' habitat can be obtained. Such artificial muddy sand will be advantageous for transport and/storage of the live baits. By adjusting the mixing ratio of the plant cellulose fiber and the seashore muddy sand on the live baits' habitat so that a relatively large amount of the plant cellulose fiber may be contained, the lightweight artificial muddy sand having a high water holding ability (i.e., holding an adequate amount of the artificial seawater) can be obtained. It is also possible to obtain the artificial muddy sand approximating the natural muddy sand by adjusting the mixing ratio so as to contain a relatively large amount of the seashore muddy sand. Alternatively, the artificial muddy sand conjugating the advantageous characteristics of the plant cellulose fiber and the seashore muddy sand can be obtained by adjusting said mixing ratio of these two components to approximately 1:1.

On the step of preparing the mixture, the plant cellulose fiber fibrillated in the artificial seawater and the seashore muddy sand of the live baits' habitat maybe mixed with additives such as activated charcoal to add the artificial muddy sand with characteristics of such additives. Added with the activated charcoal, the artificial muddy sand having a deodorant effect can be obtained. The activated charcoal is mixed preferably in the form of fine grains or powder.

The step of obtaining the artificial muddy sand containing the artificial seawater from said mixture is performed by pressing an appropriate amount of the mixture depending on a desired grain size of the artificial sand to remove an excessive amount of water (i.e., the artificial seawater) and thereby to make granular artificial muddy sand still containing an appropriate amount of water. Size and shape of this grain is not critical but the shape thereof generally in the order of 2 mm~15 mm. The artificial muddy sand should be deformable under a light pressure of the finger tip and a degree at which the artificial muddy sand should be solidified depends on various factors such as an amount of the seashore muddy sand, a content of the artificial seawater and a degree of pressing.

In the description as has been given hereinabove, the artificial seawater adjusted to have "the same salinity" as the native seawater of the live baits should be understood to include also the artificial seawater adjusted to have the salinity which can be evaluated to be same as said native seawater of the live baits. This is for the reason that the conditions of the seawater are not constant throughout the year even on the same habitat and more or less depends on various factors such as amount of rainfall, seasons and temperature. The average salinity of the native seawater for the live baits is one of said conditions of the seawater and in a range of 2°~4°, usually about 2.5°. "Artificial seawater" should at least contain salt and may additionally contain the other basic ingredients of the natural seawater (e.g., sodium chloride).

EFFECT OF THE INVENTION

The method according to the invention for transport and/or storage of live baits enables a loss during transport and/or storage to be minimized and enables a freshness of the live baits to be maintained for a long period. The container according to the invention is not only convenient for transport and/or storage of the live baits but also convenient to handle at the site of fishing and effective to prevent the live baits from creeping out therefrom. This novel container is able to store the live baits in a fresh condition for a long period and therefore makes it possible to stabilize a supply of the live baits. This novel container is useful also for import of the live baits for fishing from foreign countries and therefore useful for conservation of resources.

Identification of Reference Numerals Used in the Drawings:

1 container
2 artificial muddy sand
3 live bait
5 lid
6 chill storing agent
7 passage 8 outer casing
9 base
10 through-hole
11 partition
12 lid of outer casing
13 reinforcing ribs
15 top plate
16 bottom plate
17 outer periphery of flange
20 space
21 flange
22 outer casing
25 base
26 upper opening
27 inner peripheral surface

What is claimed is:

1. Method for making artificial muddy sand used to transport and/or store live baits comprising steps of:

immersing paper product in artificial seawater to fibrillate said paper product;

preparing a mixture of plant cellulose fiber of said paper product fibrillated in said seawater and muddy sand of the live baits' native seashore; and forming granular artificial muddy sand containing an amount of seawater from said mixture.

2. Method for making artificial muddy sand used to transport and/or store live baits according to claim 1, wherein said step of fibrillating paper product comprise a step of immersing paper product in the artificial seawater adjusted to have a same salinity as that of the live baits' native seawater to fibrillate said paper product.

* * * * *